United States Patent [19]

Miller et al.

[11] 4,195,359
[45] Mar. 25, 1980

[54] AUTOMATIC ECHO DETECTION AND CLASSIFICATION SYSTEM

[76] Inventors: Paul H. Miller, 1400 S. Joyce St., Apt. B-1709, Arlington, Va. 22202; Tillman H. Schafer, 509 Shady Dr., Endwell, N.Y. 13760

[21] Appl. No.: 439,941

[22] Filed: Jun. 28, 1954

[51] Int. Cl.² ............................................. G01S 9/66
[52] U.S. Cl. ..................................... 367/94; 367/97; 367/112; 367/901
[58] Field of Search ................. 340/3, 6, 16, 3 R, 3 D; 178/89, 123

[56] References Cited

U.S. PATENT DOCUMENTS

| | | | |
|---|---|---|---|
| 2,431,854 | 12/1947 | Wood | 367/97 |
| 2,684,471 | 7/1954 | Hiller | 367/90 |

Primary Examiner—Richard A. Farley
Attorney, Agent, or Firm—R. S. Sciascia; G. J. Rubens

EXEMPLARY CLAIM

1. In an automatic echo detection and classification system wherein sonar equipment transmits pulses toward a target in predetermined and equal time intervals and receives background, dopplered and undopplered echoes which are produced as video output and audio output, the improvement which comprises means for establishing a non-directional background reference signal voltage from the video output, means for separating the audio output into dopplered signal voltage outside the reverberation band and undopplered signal voltage within the reverberation band, means for algebraically adding the background reference signal voltage to both the dopplered and undopplered signal voltages, a first amplifier for the resultant dopplered signal voltage, a target indicator alarm, a first energizing circuit therefor operative by the amplified dopplered signal voltage to indicate that a target has been located, means for obtaining from the resultant undopplered signal voltage a selected signal voltage above a predetermined level, a first gate normally in closed position, a first multivibrator therefor and operable by the selected undopplered signal voltage to move to open position for a predetermined interval to pass a first echo of a predetermined duration, a second gate normally in open position for passing the first echo after it has passed the first gate, a second multivibrator for the second gate operative to close the second gate for a predetermined period, an amplifier for the undopplered signal voltage of the first echo after it has passed through both the first and second gates, a second energizing circuit for the target alarm, said second circuit including the second multivibrator, and being operative to energize the second multivibrator by the amplified undopplered signal voltage of the first echo after it has passed through the second gate and after the predetermined period for which the second gate is closed and a second echo appears, which is substantially within the same range as the first echo, the second gate will be open for passing of the second echo to operate the target indicator alarm.

2 Claims, 3 Drawing Figures

| ECHO NOT TOO LONG | ECHO TOO LONG | |
|---|---|---|
|  | | BIASED RECTIFIER OUTPUT |
|  | | AMPLIFIER & CLIPPER OUTPUT |
|  | | DIFFERENTIATOR OUTPUT |
|  | | RECTIFIER + OUTPUT |
|  | | MULTIVIBRATOR #1 OUTPUT |
|  | | RECTIFIER − OUTPUT |
|  | | GATE #1 OUTPUT |

AUTOMATIC ECHO DETECTION AND CLASSIFICATION SYSTEM

The invention described herein may be manufactured and used by or for the Government of the United States of America for governmental purposes without the payment of any royalties thereon or therefor.

This invention relates to an automatic detection and classification device for sonar equipment and more particularly to such a device that measures each sonar variable instantly and continuously by comparing it with a standard. When all criteria are met, the device automatically reports the presence of a submarine or other selected target.

Apparatus having performed the function of this invention includes a simple threshold device which is sensitive only to signals within the vicinity of one specific range.

The present invention utilizes a sonar equipment monitor for the automatic detection and classification of sonar echoes, to aid in the study of detection and classification of active sonar signals, and to provide a standard of operator performance of these tasks. The automatic detection and classification device (hereinafter referred to as ADAC) employed in the present invention is sensitive to echoes from targets at all ranges out to the maximum range of the sonar. This obviates the necessity of having several devices, each for a specific range interval.

The ADAC, when used with a scanning sonar, uses an average of reverberation from all directions rather than a time averaging scheme to derive a background level against which to compare the present signal, as in previously known devices. The ADAC makes use of both doppler effect and echoes with no doppler, hereinafter referred to as dopplered and undopplered signals, which has not previously been done. The ADAC rejects echoes with no doppler which are too long and requires echoes with no doppler and of proper length to occur twice in succession before reporting the selected target. The ADAC separates dopplered and undopplered echoes into different channels. The dopplered echoes activate the indicator immediately while the undopplered echoes must occur on two successive pings at approximately the same range, and must be shorter in time than a certain limit. This requirement is intended to discriminate against occasional bursts of noise, wakes, reefs, etc.

An object of the present invention is the provision of a sonar equipment monitor which, when used jointly with an operator in service on shipboard, establishes a minimum standard of performance for the combination of monitor and operator.

An object of the present invention is the provision of a sonar equipment monitor which can be used for an objective evaluation of operator performance during various types of tests both in the laboratory and at sea.

Another object of the present invention is the provision of a sonar equipment monitor for objectively evaluating operator performance before and after training to determine the effectiveness of operator training procedures.

Another object of the present invention is the provision of a sonar equipment monitor that does not interfere with the electronic operation of such equipment.

Another object of the present invention is the provision of a sonar equipment monitor that would permit the elimination of an operator at sea by its use as an alarm device.

Still another object of the present invention is the provision of a sonar equipment monitor to be used in a Sonar Early Warning System to convert sonar signals into digital information to simplify communication from drones to the central information processing center.

A still further object of the present invention is the provision of a sonar equipment monitor which, by appropriate changes in the echo-length multivibrator, may be utilized in mine-hunting as well as in anti-submarine warfare.

Other objects and many of the attendant advantages of this invention will be readily appreciated as the same becomes better understood by reference to the following detailed description when considered in connection with the accompanying drawings wherein.

The general principle underlying this invention is that the equipment shall use only properties of the sonar signal that are physically measurable, specifically those that are functionally related to measurable physical properties of underwater targets and concentrated about different values when different classes of target are present. This last requirement means that the variable must provide some degree of statistical discrimination between the selected target type and others. The most firmly established properties that meet these requirements are amplitude (relative to a suitable standard of background level), frequency (relative to reverberation frequency), echo length, and repetition within an interval of possible range change. The related target properties are target strength, radial speed, extent in bearing and range, and limited speed and acceleration.

The first of three criteria to be met before a target is reported is the doppler requirement, or the amplitude requirement for an undopplered signal. The doppler requirement is that there be a pulse of signal differing in frequency from the mean reverberation frequency by at least one half the reciprocal of the transmitted pulse length, and having a certain minimum amplitude requirement generally different from that of undopplered echoes. The amplitude requirement for an undopplered signal is that the signal in the audio channel is greater by some fixed amount than the amplitude of the signal received on the video channel averaged over all bearings.

Echo length is the second criterion of a submarine echo. Undopplered signals shorter than the ping length are rejected by attenuation in a narrow band filter. Dopplered signals shorter than the ping length are similarly rejected by rectifying and filtering with a low pass filter with a cut-off of 40 cps. These echoes that meet the first criterion and get through the filters are clipped, measured, and rejected if they exceed a pre-determined length.

The third criterion is that echoes that meet the first two criteria occur at the same range on two successive pings, allowing for the greatest possible change in range (of the order of ±100 yards). This criterion is applied by measuring the separation of the two successive echoes electronically.

Figure 1:
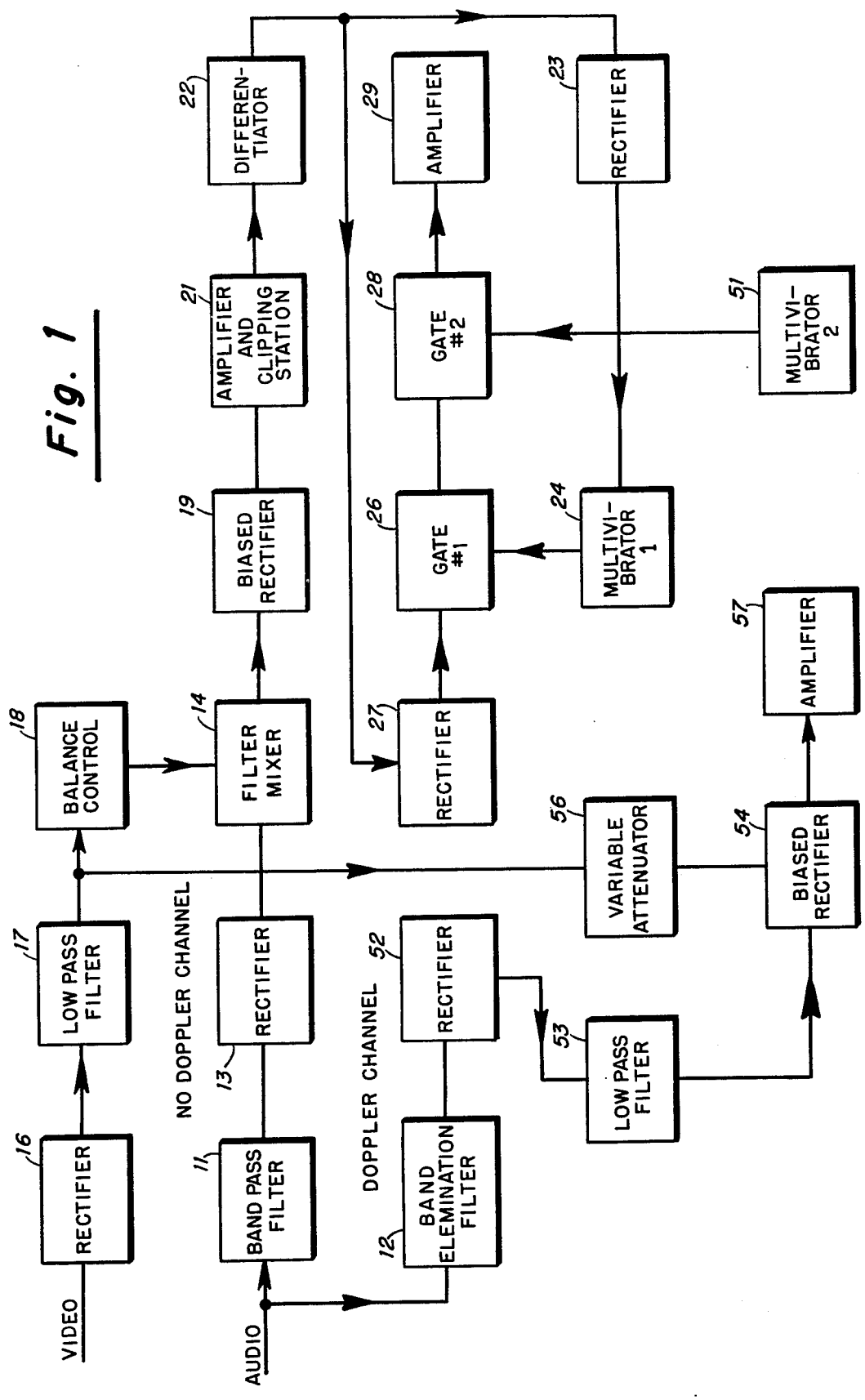
FIG. 1 shows a block diagram of the automatic detection and classification device.

Referring now to FIG. 1, the Aural Channel ADAC takes for its primary signal the audio output of the sonar equipment. This output is filtered to separate it into two channels, a band pass filter 11 which passes everything within the reverberation band and a band elimination filter 12 which passes everything outside the band. The band pass filter 11 should have a frequency characteristic that matches the amplitude spectrum of the reverberation with a center frequency of 800 cps, while the band elimination filter 12 should have a pass band characteristic that is the inverse to that of band pass filter 11. The band pass filter 11 leads to the "no-doppler" channel and the band elimination filter 12 leads to the "doppler" channel. Each channel will be considered separately.

In the "no-doppler" channel, after the signals have passed through filter 11 they are rectified by rectifier 13 which is polarized such that the a.c. signals impressed upon it give a positive voltage output with respect to ground. This rectifier output has subtracted from it a background reference voltage in a low pass filter and mixer 14 which functions, in part, as a voltage adder, and passes frequencies of 0 to 50 cps. The filter and mixer 14 merely adds to the rectifier output voltage the background voltage which has been polarized negative with respect to ground. The background signal is taken from the output of the video scan switch of the sonar equipment. This signal is rectified by rectifier 16 which is polarized such that a.c. signals impressed upon it give a negative voltage output with respect to ground. The background signal then goes through a special low pass filter 17 which is specified by its response to a unit impulse rather than its frequency response. The ideal response of the filter to a unit impulse is constant from time zero to the lapsed time of 34 ms and the response is zero thereafter. The filter 17 in actual practice should give a result as close to this as is practical. At the output of the filter this amounts to always examining the average of the last 360° scanned by the video scanning switch and is the simplest way of achieving a continuous average of the signals from all 360° covered. This may be explained as follows: Since the ping-length is 35 ms long there can be no statistically independent samples of signal more frequent than once every 35 milliseconds. The scanning switch takes roughly a 1-ms sample from each direction and loses no information in doing so since the signal will be reexamined again in 34 ms. Hence, if a filter is used which averages the scanning switch output within 34 ms, it in reality is averaging over 360° in bearing.

Figure 3:
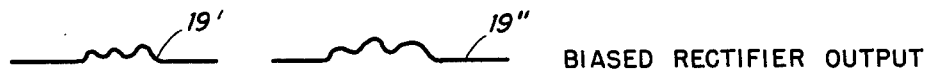
FIG. 3 shows the time relationship of echo signals too long, and short enough, to pass through Gate No. 1 shown in FIG. 1.
Figure 3:
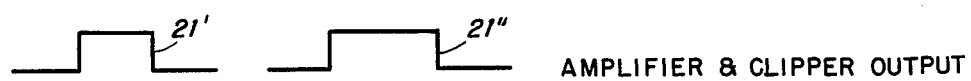
Figure 3:
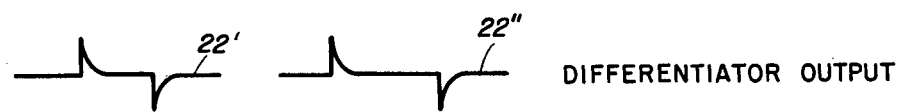
Figure 3:
Figure 3:
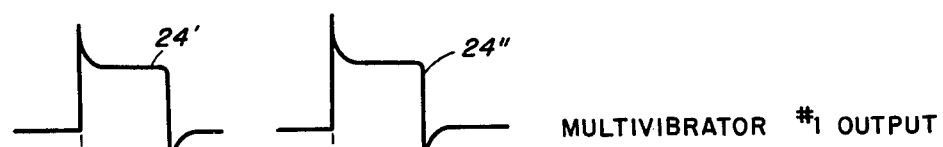
Figure 3:
Figure 3:
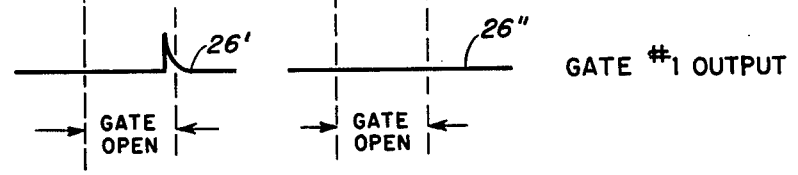

The background signal then goes through a balance control 18 to the mixer and low pass filter 14. The balance control 18 has a range sufficient to cause the mixer and filter 14 to give an average DC output of zero voltage when no target is present. The output of the mixer and filter 14 is fed to a biased rectifier 19 which will conduct only if the audio input signal exceeds a certain level. Rectifier 19 is a threshold device and should have an easily accessible bias control. The output of rectifier 19 is indicated as 19', 19'' on FIG. 3. After this the signal is subjected to large amplification and clipping at station 21 which makes a rectangular pulse 21', 21'', whose duration is equal to the length of time the biased rectifier 19 conducts. This pulse 21', 21'', is then differentiated at 22, providing output 22', 22'', and the differentiated portion of the pulse 23', 23'', which corresponds to the leading edge and is positive, passes through rectifier 23 triggering a one shot multivibrator 24 to provide output 24', 24'', controlling gate 26 which passes a signal pulse corresponding to the trailing edge of echoes whose duration is less than a given length. The differential portion of the pulse 27', 27'', which corresponds to the trailing edge is negative, passes through rectifier 27, and passes through gate 26, as at 26', if it is still open. If the trailing edge occurs too late, gate 26 will be closed and no output results as indicated at 26''. The gate opening time should be adjustable between 25 and 200 ms. Discrimination against echoes which are too long is thus accomplished, as will be seen in FIG. 3.

Figure 2:
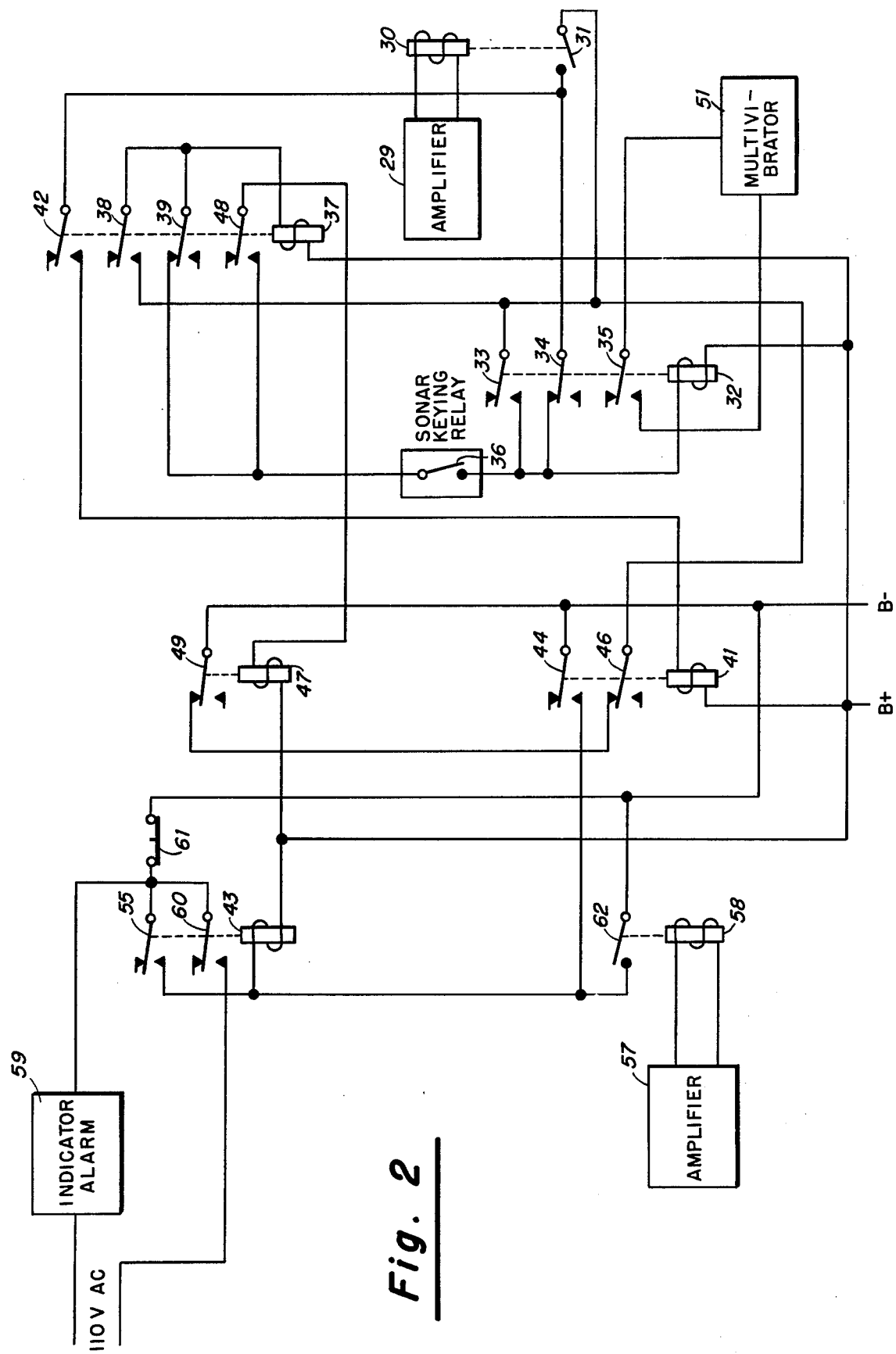
FIG. 2 shows relay circuits employed in the block diagram of FIG. 1.

The output from gate 26 then passes through a second gate 28 which is normally open until after one signal has proceeded this far. The second gate, 28, will be considered after describing the relay circuits which require two echoes at the same range to cause indication. After passing the second gate, 28, the signal is then amplified at 29 sufficiently to activate a relay 30, FIG. 2. Referring now to FIG. 2, closing the relay contacts 31 energizes relay 32 which has a pair of holding contacts 33 which make before the normally closed contacts 34 break. The next event which will occur is that the sonar keying relay will close a pair of contacts 36. This will energize relay 37 which, like relay 32, has a pair of holding contacts 38 which make before the normally closed ones 39 break. Relay 37 will not immediately operate to close its contacts, being of a suitable delay type sufficient to prevent operation of its contacts until the lapse of an interval of time in excess of the keying time. After this, one of two things may happen, either a second signal occurs, or it does not.

Suppose first that the second signal does occur. The contacts 31 of relay 30 will close again and this time energizes relay 41 because contact 42 of relay 37 was closed on the previous operation and there will be no effect on relay 32 since contacts 34 were opened on the previous operation. Normally open contact 44 of relay 41 makes before the normally closed contact 46 breaks. The normally open contact 44, upon closing, energizes relay 43. The normally closed contact 46 upon opening, opens the voltages to relays 32, 37, 41, and 47. Hence the relays are cleared for a new signal and the indicator 59 is activated by contact 60 of relay 43. Now suppose that a signal did not occur the second time. Then the next occurrence will be the closing of the keying relay contacts 36. This will energize relay 47 through contact 48 of relay 37 which has previously been closed. When relay 47 is energized, its normally closed contact 49 is opened, taking the voltage from the relays 32, 37, 41, and 47 which clear the relays and restores the circuit to its original condition for a new signal.

Referring back to FIG. 1, multivibrator 51, called a range gating multivibrator, is made operative by normally open contacts 35 of relay 32. This multivibrator 51 is a free running one when operative, but when disabled should return to its quiescent condition, leaving gate 28 open. When operated it immediately closes gate 28 and leaves it closed until approximately 100 ms before the next occurrence of the range at which it was closed. In other words, this is the keying interval minus 100 ms. The gate stays open for 200 ms and then closes again. If there is a signal the second time, the relay 32 will be opened and gate 28 will remain open until the reception of another signal. If there is no signal, relay 32 will be open at the occurrence of the next keying pulse.

Now consider the "doppler" channel. Here the incoming signal has been filtered by the band elimination filter 12 so that almost all reverberation has been removed. From the filter the output is fed to a rectifier 52 whose output is positive with respect to ground. After rectification it passes through a low pass filter 53 having a cut-off frequency of 40 cps. Such filtering is necessary here because the predominant background in this channel is noise which may contain high frequencies. These high frequencies are undesirable since the sonar echo envelopes which are desired contain no useful information in frequencies higher than the reciprocal of the ping length. Hence the filter cut-off frequency of 40 cps.

The output of the filter 53 passes to a biased rectifier 54 which is controlled to some extent by the reverberation background voltage from the sonar video channel through a variable attenuator 56. This counteracts any reverberation that may pass through band elimination filter 12. The output of the biased rectifier 54 is then amplified at 57 to activate relay 58 closing contact 62, energizing the indicator relay 43 which closes holding contact 55 and contact 60 which turns on the indicator 59. The push button 61 is a manual switch actuated by the operator to turn off the indicator.

The following table shows which targets produce echo signals which meet the criteria required by the present invention for passage to the final output where they are reported. Criteria one is the doppler requirement or amplitude requirement for an undopplered signal. The second is the echo length of a submarine echo and the third is that echoes that meet the first two criteria occur at substantially the same range on two successive pings.

| TARGET | CRITERION | | | |
|---|---|---|---|---|
| | 1 | 2 | 3 | 1,2,& 3 |
| Whales (no doppler) | 1 | 1 | 1 | 1 |
| (doppler) | 1 | 0 | 1 | 0 |
| Kelp (small patches) | 1 | 1 | 1 | 1 |
| (large beds) | 1 | 0 | 1 | 0 |
| Fish (no doppler) | 1 | 1 | 1 | 1 |
| (doppler) | 1 | 0 | 1 | 0 |
| Pinacles, wrecks, rocks | 1 | 1 | 1 | 1 |
| Bottom, non-localized | 1 | 0 | 1 | 0 |
| Canyon walls | 1 | 0 | 1 | 0 |
| Reverberation | 0 | 0 | 1 | 0 |
| Noise Spikes | 1 | 0 | 0 | 0 |
| Submarines | 1 | 1 | 1 | 1 |

It should be noted that the present invention uses an average of reverberation from all directions rather than a time averaging scheme to derive a background level against which to compare the present signal. Since this is not possible except in sonars having fast scanning in bearing, it is within the scope of this invention to substitute a time-variable or reverberation variable voltage at the input to the balance control 18.

When the present invention is utilized with a frequency-modulated continuous transmission (FMCT) sonar, the space averaging takes place over range rather than in bearing as previously described. In this application the echo length is determined by the rate of scan in bearing, beam width of the receiving hydrophone and the angle in bearing subtended by the target at the receiving transducer. Here doppler shows up as a range error so that only one channel would be needed rather than the two channels as described in the preferred embodiment.

One modification of the preferred embodiment of the present invention would be to further discriminate against random noise pulses and other short signals by including in each channel of the circuits a time delayed gate for eliminating pulses of too short a duration, in the same manner that pulses of too long a duration are eliminated.

A modification within the scope of the present invention is to eliminate the holding switch 55 and push button 61. When this is done the indicator circuit becomes self clearing which is particularly desirable, for example, in remote controlled application or in instances where it is desirable to minimize the number of communication channels between a control location and the remote location.

A further modification is to replace mixer 14 with a variable gain amplifier. The signal from balance control 18 is fed in as control bias on the variable gain amplifier which varies the gain of the signal coming from the audio channel. Rectifier 13 in this modification is no longer needed. The polarity of the signal from rectifier 16 should be negative to decrease the gain of the amplifier, i.e., the gain of the amplifier is roughly inversely proportional to the amplitude of the signal from the video channel. Since the output of the video channel can be used as an estimate of the expected average level of the audio signal, this portion of the system also may be used in other areas, for example, as in automatic volume control of the audio channel of scanning sonar systems.

While the background signal in the present application came from the video channel of the sonar, it is further contemplated that the background signal, in the case of sonar, might come from a non-directional hydrophone with appropriate amplifiers and changing the parameters of the low pass filter 17 to fit the new requirements for signal processing. In present scanning sonars, such a non-directional hydrophone may be utilized by the simple expedient of summing the outputs from all staves of the transducer. In general application, this background signal may come from any monitor of background level where the signal channel has some means of selection, i.e., directional selectivity or a more restricted frequency selectivity.

While the preferred embodiment of the present invention has been applied to sonar equipment, its application to any signal system which can make use of any or all of the established criteria should be readily apparent.

Obviously many modifications and variations of the present invention are possible in the light of the above teachings. It is therefore to be understood that within the scope of the appended claims the invention may be practiced otherwise than as specifically described.

What is claimed is:

1. In an automatic echo detection and classification system wherein sonar equipment transmits pulses toward a target in predetermined and equal time intervals and receives background, dopplered and undopplered echoes which are produced as video output and audio output, the improvement which comprises means for establishing a non-directional background reference signal voltage from the video output, means for separating the audio output into dopplered signal voltage outside the reverberation band and undopplered signal voltage within the reverberation band, means for algebraically adding the background reference signal voltage to both the dopplered and undopplered signal voltages, a first amplifier for the resultant dopplered signal voltage, a target indicator alarm, a first energizing circuit therefor operative by the amplified dopplered signal voltage to indicate that a target has been located, means for obtaining from the resultant undopplered signal voltage a selected signal voltage above a predetermined level, a first gate normally in closed position, a first multivibrator therefor and operable by the selected undoppled signal voltage to move to open position for a predetermined interval to pass a first echo of a predetermined duration, a second gate normally in open position for passing the first echo after it has passed the first gate, a second multivibrator for the second gate operative to close the second gate for a predetermined period, an amplifier for the undoppled signal voltage of the first echo after it has passed through both the first and second gates, a second energizing circuit for the target alarm, said second circuit including the second multivibrator, and being operative to energize the second multivibrator by the amplified undopplered signal voltage of the first echo after it has passed through the second gate and after the predetermined period for which the second gate is closed and a second echo appears, which is substantially within the same range as the first echo, the second gate will be open for passing of the second echo to operate the target indicator alarm.

2. In an automatic echo detection and classification system wherein sonar equipment transmits pulses toward a target in predetermined and equal time intervals and receives background, dopplered and undopplered echoes which are produced as video output and audio output, the improvement which comprises means including a low pass filter for establishing a negative background reference signal voltage from the 360° range of the video output, a band elimination filter for passing audio output outside the reverberation band to provide a dopplered signal voltage channel, a band pass filter for passing the audio output within the reverberation band to provide an undopplered signal voltage channel, means including a low pass filter and a rectifier in the dopplered channel, for subtracting the background reference signal voltage from the dopplered signal voltage to provide a resultant dopplered signal voltage, a first means for amplifying said resultant dopplered signal voltage, a target indicator alarm, a first relay circuit therefor and operative by the amplified dopplered signal voltage to indicate that a target has been located, means including a rectifier and a filter for subtracting the background reference voltage from the undopplered signal voltage to provide a resultant undopplered signal voltage, a biased rectifier for obtaining from said resultant undopplered signal voltage a selected signal voltage above a predetermined level, means for shaping and other means for differentiating the selected signal voltage, a first gate normally in closed position, a first multivibrator therefor and operable by the selected undopplered signal voltage to move to open position for a predetermined interval to pass a first echo of a predetermined duration, a second gate normally in open position for passing the first echo after it has passed the first gate, a second multivibrator for the second gate therefor operative to close the second gate for a predetermined period, an amplifier for the undopplered signal voltage of the first echo after it has passed through both the first and second gates, a second energizing circuit for the target alarm, said second circuit including the second multivibrator and one relay for independently operating the second multivibrator and a second relay for independently operating the target signal alarm, said one relay being operative to energize the second multivibrator by the undopplered signal voltage of the first echo after it has passed through the second gate and said second relay being operative, when a second echo appears which is substantially within the same range as the first echo and while the second gate is open to operate the target alarm.

* * * * *